March 29, 1927.
C. E. MEYER
TREATMENT OF ZINC GOLD SLIMES AND APPARATUS THEREFOR
Filed April 10, 1922   2 Sheets-Sheet 1
1,622,960
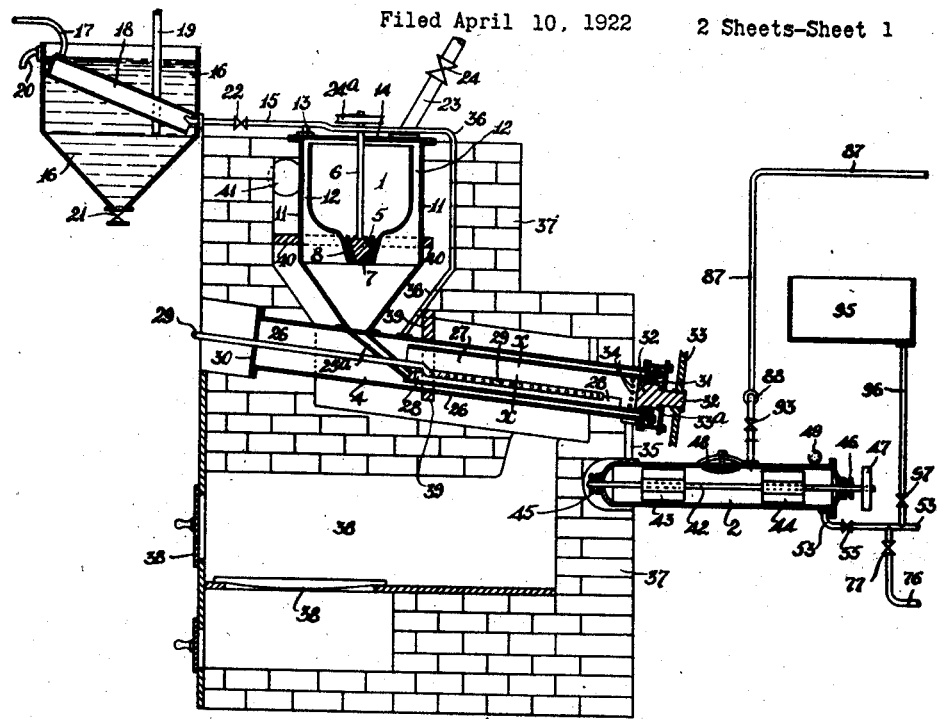
Fig. 1.
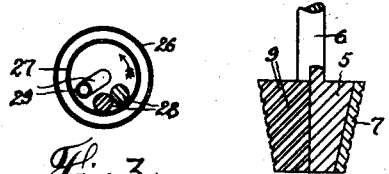
Fig. 3.   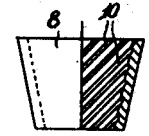 
Fig. 4.   Fig. 5.
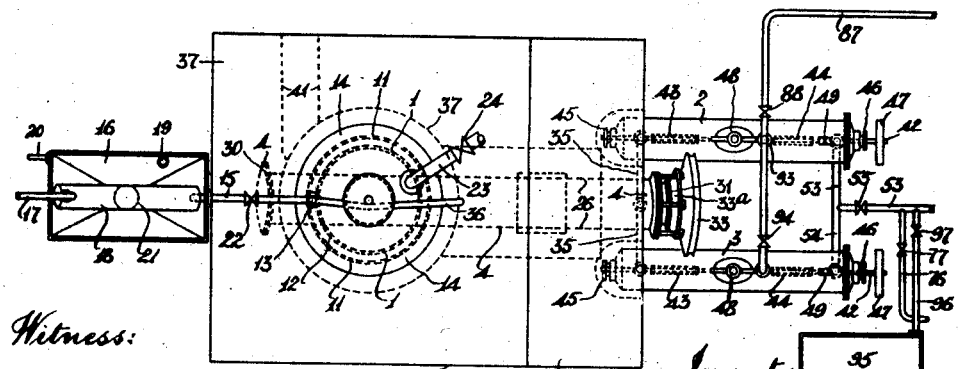
Fig. 2.
Witness:
Arthur Thompson
Inventor
Charles Edward Meyer March 29, 1927.
C. E. MEYER
1,622,960
TREATMENT OF ZINC GOLD SLIMES AND APPARATUS THEREFOR
Filed April 10, 1922 2 Sheets-Sheet 2
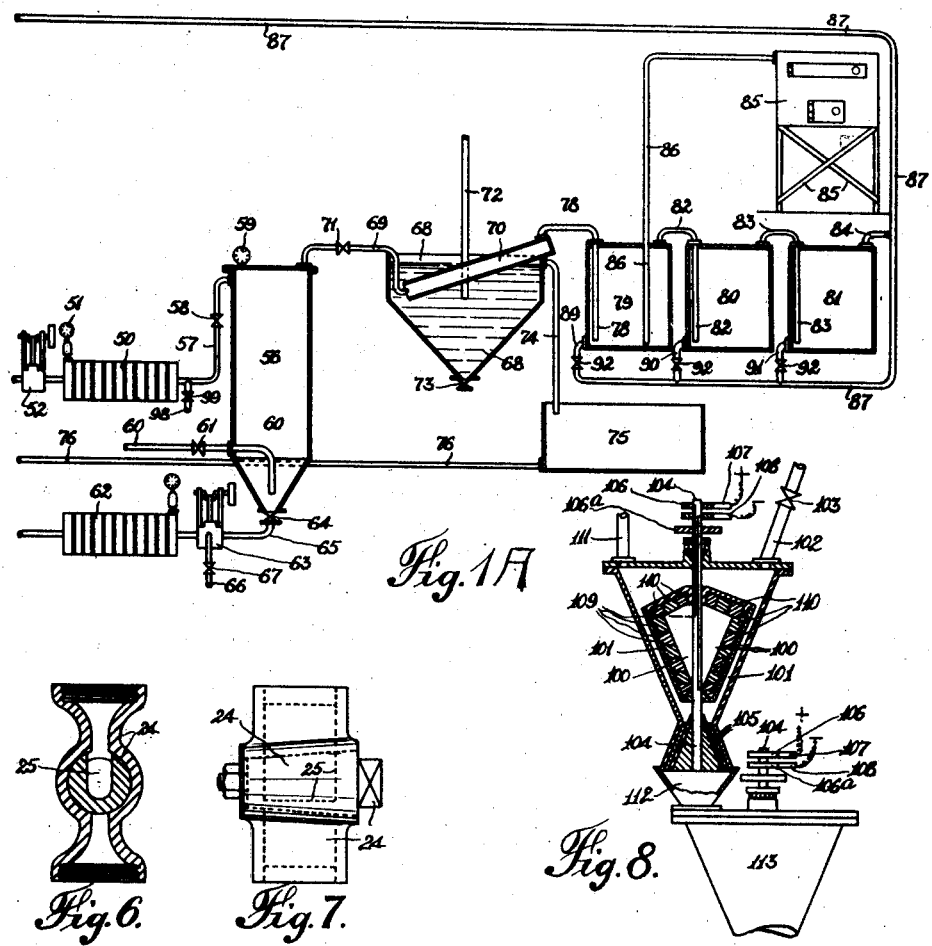
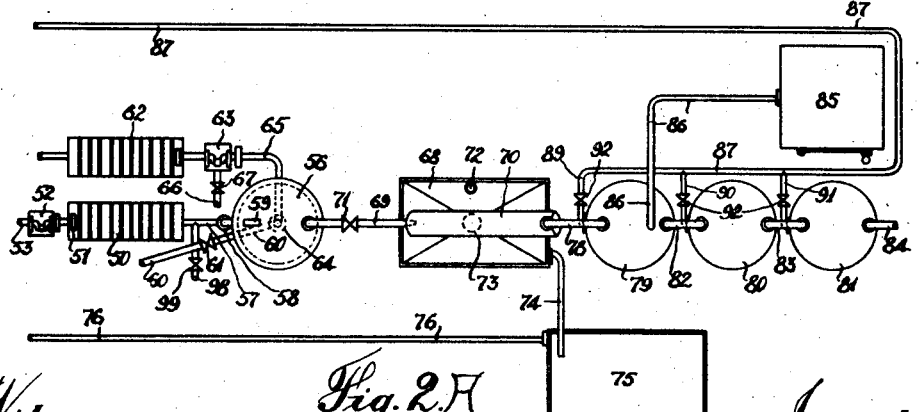
Witness: Arthur Thompson
Inventor: Charles Edward Meyer.

Patented Mar. 29, 1927.

1,622,960

UNITED STATES PATENT OFFICE.

CHARLES EDWARD MEYER, OF JOHANNESBURG, TRANSVAAL, SOUTH AFRICA.

TREATMENT OF ZINC-GOLD SLIMES AND APPARATUS THEREFOR.

Application filed April 10, 1922, Serial No. 551,295, and in the Union of South Africa April 16, 1921.

This invention relates to apparatus for the treatment of "zinc-gold slimes" formed in the zinc precipitation boxes employed in the cyanide process of recovering gold from its ores.

The apparatus according to this invention is utilized to carry out a process wherein the oxidizing of the slimes is effected by means of dry steam, not under pressure, and in the presence of heat applied to the oxidizing vessel either internally or externally.

The apparatus includes a means or vessel in which the zinc-gold slimes are oxidized by heat applied to said vessel either externally or internally, and may include disintegrating means within said vessel to break up the partially oxidized zinc-gold slimes, a dephlegmator for collecting the hydrogen evolved in the oxidizing vessel, a rabbler or rabblers into which the partially oxidized zinc-gold slimes are delivered from the oxidizing vessel and in which said slimes are subjected to the action of steam, an agitator or agitators containing a solution of ammonium carbonate into which the slimes are delivered from the rabbler or rabblers and in which agitation is carried on until the solution of the zinc oxide in the ammonium carbonate is complete, a filter press wherein the remaining solids are separated, a further vessel which receives the liquid from the filter press, in which vessel the zinc in the form of a precipitate of zinc oxide and zinc carbonate is separated by the action of steam and the ammonia and ammonium carbonate passes out in the form of gas, a dephlegmator and Woulfe's bottles which serve to trap said evolved ammonia and ammonium carbonate gases and dissolve the same forming solutions, with ammoniacal water, of ammonia and ammonium carbonate, a filter press for separating the solid zinc precipitates, a furnace for calcining the same, and means for leading the carbon dioxide from the furnace to the Woulfe's bottles for use in converting the free ammonia therein contained into ammonium carbonate for use in the agitator or agitators.

In the accompanying drawings I illustrate a plant or apparatus for carrying out the treatment of the zinc-gold slimes in the preferred manner.

In the drawings,

Fig. 1 is a part-sectional elevation of a portion of the complete apparatus, and Fig. 1^A is a similar view of the remaining portion thereof.

Fig. 2 is a plan of the portion of the apparatus shown in Fig. 1 and Fig. 2^A is a similar view of the portion shown in Fig. 1^A.

Fig. 3 is a cross-section of the rabbler on line $x-x$, Fig. 1.

Figs. 4 and 5 are enlarged part-sectional views of the grinding or disintegrating means employed in the oxidizing vessel.

Figs. 6 and 7 are sectional elevation and side elevation respectively, of the means for feeding the zinc-gold slimes intermittently into the oxidizing vessel, and Fig. 8 is a part-sectional elevation of a modified form of the oxidizing vessel equipped with internal electrical heating means, and showing the same adapted to discharge into a second similar oxidizing vessel.

Referring more particularly to Figs. 1, 1^A, 2, 2^A and 3 to 7 of the drawings, the plant is shown consisting of the one oxidizing vessel 1, with two agitators 2, 3, and a rabbler 4 arranged intermediate the oxidizing vessel 1 and the agitators 2, 3. The grinding, reducing or distintegrating means is provided at the bottom of the oxidizing vessel 1, and, as shown,—see also Figs. 4 and 5—includes a cone-shaped head 5 provided on the lower end of the driving shaft 6, on which is fitted a shell or mantle 7, which head 5 is adapted to rotate in a conically shaped shell or lining 8 secured in the bottom of the vessel 1. The mantle 7 and shell 8 may be constructed with grinding or reducing surfaces having oppositely inclined flutes, grooves, ribs, et cetera, 9, 10, respectively, or alternatively, said disintegrating means or devices may be of any other preferred or suitable construction.

The oxidizing vessel 1 is enclosed in a jacket or casing 11, and a passage 12 is provided between the vessel 1 and its jacket 11 for the evolved hydrogen to the outlet 13 in the cover 14 of the jacket. The outlet 13, through pipe 15 leads to a dephlegmator and condenser 16 from which the hydrogen will be withdrawn and led to a gasometer or receiver—not shown—for storage, through a pipe 17 which communicates with the upper closed end of the cylinder 18 which is open at the lower end, into which lower end pipe 15 projects. 19 is a pipe for introducing the water into the tank 16 of the dephlegmator and 20 an overflow pipe; 21 being a valve for withdrawing any deposit from the tank 16 in cleaning out the same. 22 is a valve in pipe 15 for regulating the passage of hydrogen to the dephlegmator.

23 is a pipe for introducing the wet zinc-gold slimes into the oxidizing vessel 1, and 24 is a valve in said pipe which may, as shown in Figs. 6 and 7, be constructed with a recess 25 to deliver a fixed quantity of the slimes into the vessel each time the valve is rotated. This valve 24 may be operated either by hand or suitable mechanical power at regular intervals, and while admitting the zinc-gold slimes will preclude the escape of hydrogen through the slimes inlet pipe 23.

The shaft 6 of the grinding means extends through the cover 14 of the jacket or casing 11 and may be provided with a worm wheel 24$^a$ or other suitable means for rotating the shaft at the desired speed.

The jacket or casing 11 in its lower portion is made of hopper shape and discharges into a chute 25$^a$ which delivers the partially oxidized product into the rabbler, which consists of the outer stationary cylinder or casing 26, and the inner revolvable cylinder 27 in which—see Fig. 3—two, more or less, rollers 28 are arranged to operate on the partially oxidized zinc-gold slimes in their passage through the rabbler. 29 is a steam supply pipe which projects into the revolvable inner cylinder 27 and is arranged to deliver the jets of steam so that they are directed upon the slimes in the opposite direction to that of the movement of the rollers 28 in the cylinder 27.

The outer cylindrical casing 26 at one end is fitted with a cover 30, and at the other end is fitted with a gland 31 in which is rotatably supported the trunnion 32 of the inner revolvable cylinder 27; 33 being a wheel or pulley fixed on the trunnion 32 for rotating cylinder 27 and 33$^a$ a thrust bearing for the trunnion 32.

34 is a ring of holes in the lower end of cylinder 27 which allow the oxidized zinc-gold slimes to pass into the outer stationary cylinder 26 whence they pass through a hole and two inclined pipes 35 into both of the agitators 2, 3. 36 is a pipe for conveying hydrogen from the stationary outer cylinder 26 to the pipe 15 and dephlegmator 16.

The oxidizing vessel 1 and the rabbler 4 are built in a fire brick or other suitable structure or setting 37 immediately above a furnace 38. 39, 40 are baffles for the hot gases or products of combustion as they pass from the furnace 38 to a passage 41 leading to the flue or chimney.

The agitators 2, 3, each comprise a casing to receive the solution of ammonium carbonate to dissolve the zinc oxide, in which casing is arranged a revolvable shaft 42 on which is fixed paddles or blades 43, 44. Around the shaft 42 at the ends of the casing, glands 45, 46 are provided and at the one end of the shaft 42 a pulley 47 is fixed for rotating the shaft. 48 is a man-hole and cover in the casings of each of the agitators and 49 a pressure gauge for each agitator.

50 is a filter press of suitable construction and 51 a pressure gauge thereon. 52 is a pump for withdrawing the mass from the agitators 2, 3, through the pipes 53, 54, and introducing it into the filter press 50 to separate the solids from the liquid. 55 is a valve in pipe 53.

56 is a tank or vessel for receiving the separated liquid or zinc in solution from the filter press 50, 57 being a pipe fitted with valve 58 between the filter press 50 and the top of the tank 56. 59 is a pressure gauge on tank 56.

60 is a steam admission pipe, fitted with a valve 61, for introducing the steam into tank 56 to separate the ammonium carbonate and ammonia from the zinc oxide and zinc carbonate. To render the separation more complete, the steam pipe 60 is directed into a comparatively small space above the outlet in the conical bottom of the tank 56.

62 is a filter press and 63 a pump for withdrawing the mass consisting of water and zinc oxide and zinc carbonate from the tank 56; 64 being a valve between the bottom of the tank 56 and the pipe 65 leading to the pump 63. 66 is a pipe fitted with a valve 67 for supplying water or solution through the pump 63 to wash or treat the solids deposited in the filter press 62.

68 is a dephlegmator, 69 being a pipe for leading the ammonia and ammonium carbonate from the top of vessel 56 into the lower open end of the cylinder 70 of the dephlegmator 68. 71 is a valve in pipe 69. This valve 71 is arranged so that it opens at a pressure of approximately eighty pounds per square inch, and the water in the dephlegmator 65 is kept at approximately ninety degrees centigrade, to prevent the conversion and retention in solution to any undesirable extent of ammonia and ammonium carbonate. 72 is a pipe for introducing water into the dephlegmator tank 68. 73 a valve for removing any deposit or cleaning out said tank 68, and 74 an overflow pipe which delivers the water carrying a small amount of ammonia from the tank 68 into a sump 75 which liquid or solution can be taken from sump 75 by pipe 76 to pipe 53 so that it can be used as a wash for the solids separated in the filter press 50. 77 is a valve in pipe 76.

78 is a pipe for leading the ammonia and ammonium carbonate gases from the closed upper end of the upwardly inclined pipe or cylinder 70 to the bottom of the first of three Woulfe's bottles 79, 80, 81. The Woulfe's bottles are filled with ammoniacal water and serve to dissolve the gases thus forming a solution of ammonia and ammonium carbonate. 82, 83 are the pipes which establish communication successively between the Woulfe's bottles 79, 80, 81, and 84 is a discharge or overflow pipe from the Woulfe's bottle 81.

85 is a furnace for calcining the zinc oxide and zinc carbonate which are the solids separated in the filter press 62. In calcining this material the zinc carbonate is converted into zinc oxide and carbon dioxide, the carbon dioxide being passed from the furnace through pipe 86 to the bottom of the Woulfe's bottle 79 thereby converting the free ammonia into ammonium carbonate. The action is carried out successively in the bottles 79, 80, 81, through the medium of connecting pipes 82, 83.

87 is a pipe fitted with a valve 88 and having branches 89, 90, 91 fitted with valves 92, for conveying the ammonium carbonate from each of the three Woulfe's bottles to the two agitators 2, 3. 93, 94 are valves for controlling the supply of the ammonium carbonate to the agitators 2, 3, respectively.

95 is a tank for holding sodium acetate and 96 a pipe fitted with valve 97 for leading the sodium acetate to pipe 53 whence it passes through pump 52 into the filter press 50 and through the gold slime which constitutes the separated solids, in order to remove therefrom the lead, as lead acetate, prior to the smelting of the residue. 98 is a branch pipe from the pipe 57, fitted with a valve 99 for withdrawing the lead acetate effluent or any other solution or wash water that may be used in the process and passed through the filter press 50.

In Fig. 8 I show the modified form of the oxidizing vessel having internal electrical heating means, and illustrating the employment of a plurality of the vessels the partially oxidized or treated product from one being delivered into the other or others successively. The vessel is provided interiorly with a device 100 shaped to form a conical narrow passage 101 between it and the internal wall of the oxidizing vessel, shown of conical shape, down which passage 101 the moist zinc-gold slimes will pass and, in doing so, be brought into intimate contact with the heating medium. Such electrical heating means ensures the maintenance of the critical temperature requisite for the oxidation of the zinc contained in the zinc-gold slimes. An inlet 102 is provided into the vessel for the zinc-gold slimes and a valve or other suitable means 103 is employed for regulating the inflow.

The device forming the conical passage is shown fixed upon the vertical driving shaft 104 for the conical grinding or disintegrating means 105, shown upright instead of inverted as in Fig. 1. In this figure I show a plurality of the oxidizing vessels, equipped with the electrical heating and the grinding arrangements, the material passing from the one vessel into the other, as previously explained. Slip rings 106, 106$^a$, are fixed on the shaft 104 above the oxidizing vessel and co-operate with brushes 107, 108, for conveying the current to the electrical element 109, which is shown in the form of a coil arranged within the device 100 providing the conical passage 101. 110 are fire bricks forming the interior of the device with the coil 109 disposed between the same and the casing. 111 is the hydrogen outlet and 112 the inlet hopper for the next succeeding vessel 113.

In operating therefor the plant or apparatus illustrated in the accompanying drawings, the moist zinc-gold slimes, that is the slimes as taken from the precipitation boxes, are, if desired, first treated with a solution of an oxidizing agent such as nitre. As the object of this treatment is to bring nitre carried in solution into very intimate contact with every particle of zinc or oxidizable metal contained in the zinc-gold slimes, I preferably add to the moisture contained homogeneously throughout the mass of zinc-gold slimes, a quantity of a solution of nitre. This may be effected by placing the zinc-gold slimes in a porous vessel or receptacle and then immersing and agitating the same in a vessel containing the solution of the nitre.

The zinc-gold slimes thus preparatively treated, are now introduced into the oxidizing vessel 1, through the feed pipe 23 and valve 24. In the vessel the slimes are partially oxidized by being brought into contact with the heated walls of the vessel. The zinc-gold slimes then pass through the reducing or disintegrating means and fall on to the heated wall of the lower portion of the jacket 11, and pass through the chute into the upper end of the rabbler 4. The hydrogen evolved in the vessel 1 and jacket 11, and rabbler 4 is taken off by pipes 36 and 15, and non-return valve 22, to the dephlegmator 16. The hydrogen evolved in the jacket or casing 11 being free to pass up the passage 12, further contact of such hydrogen with the zinc-gold slimes in the vessel 1 is avoided, thereby obviating to a large extent the reversible action of hydrogen on zinc oxide,

$$Zn + H_2O \rightleftharpoons ZnO + H_2.$$

After entering the rabbler 4 the partially oxidized zinc-gold slimes are further oxidized by being subjected to the action of steam introduced through the pipe 29 and also to the grinding action of the two loose cylindrical rollers or bars 28 operating inside the rotating cylinder 27 which serve to bring the zinc-gold slimes into more intimate contact with the jets of steam.

The now oxidized slimes are delivered from the outer stationary cylinder of the rabbler into the agitators; the agitators having been previously filled with a solution of ammonium carbonate, into which the slimes are delivered gradually from the rabbler, thereby preventing cementation of the mass. Agitation of the mixture of slimes and ammonium carbonate solution is carried on until the solution of the zinc oxide in the ammonium carbonate is complete.

The mass including the solids in suspension and the zinc in solution is passed from the agitators into the filter press 50 wherein the separation of the solids from the liquid is effected.

The solids separated in the filter press 50 will ordinarily include gold, silver, lead, silica, iron, etcetera, whilst the effluent or liquid therefrom will consist of the zinc in solution in the ammonium carbonate. This liquid passes by the pipe 57 into vessel 56, wherein the ammonia is separated from the zinc by means of steam introduced through the pipe 60; the ammonia and ammonium carbonate are evolved as a gas and the zinc falls out of solution as a precipitate consisting of a mixture of zinc oxide and zinc carbonate, into the conical bottom of vessel 56. The complete separation of the ammonium carbonate and ammonia from the zinc oxide and zinc carbonate is more effectively accomplished by directing the steam from the inlet pipe 60 into the restricted area of the lower portion of the conical bottom of the vessel 56. The separation of the zinc oxide and zinc carbonate from the ammonia and ammonium carbonate should be effected at approximately a pressure of 80 (eighty) pounds per square inch to prevent dissociation of the ammonium carbonate into ammonia and carbon dioxide. This is attained by means of the valve 71 on the gas outlet pipe 69, which opens at or about that pressure, as previously described.

The gases evolved from the separation of the zinc and zinc carbonates from ammonia and ammonium carbonate in vessel 56, pass through pipe 69 and valve 71 to the dephlegmator 68. This includes the cylinder 70, open at one end and inclined upwardly at a slight angle, a passage being provided from the upper end by pipe 78, for the gases to the first of the Woulfe's bottles 79. The Woulfe's bottles 79, 80, 81, are filled with ammoniacal water and serve to dissolve the gases, forming the solution of ammonia and of ammonium carbonate.

The solids deposited in vessel 56, consisting of zinc oxide and zinc carbonate, will in the plant illustrated be separated from the water in which they are suspended, in the filter press 62, and the solids obtained are then calcined in furnace 85. In calcining the separated solids, the zinc carbonate is converted into zinc oxide and carbon dioxide and the latter gas is led into the Woulfe's bottle 78 by pipe 86, thus causing a conversion of the free ammonia into ammonium carbonate in the several Woulfe's bottles 79, 80 and 81, through the connecting pipes 82 and 83. The solution contained in the Woulfe's bottles 79, 80, 81, is then available for the treatment of a further charge of zinc-gold slimes in the agitators 2, 3, to which it is led by pipes 87, 89, 90 and 91. The solid product obtained after calcination consists of zinc oxide which may be usefully employed as a paint or applied to other useful purposes.

The water which is contained in the dephlegmator 68 and surrounds the cylinder 70, being kept at approximately 90° (ninety degrees) centigrade prevents the retention in solution of the ammonia and ammonium carbonate. The necessary regulation may be effected by the supply of cold water entering the dephlegmator 68 through pipe 72 (say from a steady head tank) and the overflow pipe 74 leading the overflow to the sump 75.

The overflow solution of ammonia which is collected in the sump 75 may be passed through pipe 75, pipe 53, and pump 52 to the filter press 50 for washing the solids deposited therein before they are discharged.

The separated solids obtained from the filter press 50, after washing, will be enriched gold slime, consisting of gold, silver, lead, silica and iron. In the condition in which it is obtained it is fusible without added flux, the silica and lead combining to form lead silicate which serves as the flux. Should it be desired to remove the lead prior to the smelting of the zinc-gold slimes, the same may be effected by leaching the product in the press with sodium acetate which may be drawn through pipe 96 from the tank 95 and delivered to the filter press 50, the effluent in this case being lead acetate which may be usefully employed for establishing the zinc-lead couple presently employed in the extractor boxes used in the cyanide works of gold recovery plants. By this treatment the gold slime is enriched to an increased extent, and it also serves the purpose of removing the corrosive material like lead from the ultimate product to be smelted.

What I claim as my invention and desire to protect by Letters Patent is:—

1. Means for treating zinc-gold slimes, including an oxidizing vessel, a rabbler for receiving the product from said vessel, and agitating means for receiving the oxidized product from the rabbler for effecting further treatment of the oxidized slimes, as set forth.

2. Apparatus for treating zinc-gold slimes, including an oxidizing vessel, a rabbler, an agitating means, means for introducing a solution of ammonium carbonate and means for withdrawing the product from the agitator, said latter means including a filter press and pump, as set forth.

3. Apparatus for treating zinc-gold slimes, including an oxidizing vessel, a rabbler, an agitating means, means for introducing a solution into the agitating means, a pump and filter press for withdrawing the product from said agitating means, and a vessel for receiving the separated liquid or zinc in solution from the filter press, as set forth.

4. Apparatus for treating zinc-gold slimes, including an oxidizing vessel, a rabbler, an agitating means, means for introducing a solution of ammonium carbonate into the agitating means, a pump and filter press for withdrawing the product from said agitating means, a vessel for receiving the separated liquid or zinc in solution from the filter press, and means for admitting steam into the vessel to separate the ammonium carbonate and ammonia from the zinc oxide and zinc carbonate, as set forth.

5. Apparatus for treating zinc-gold slimes, including an oxidizing vessel, a rabbler, an agitating means, means for introducing a solution of ammonium carbonate into the agitating means, means including a filter press for withdrawing the product from said agitating means, a vessel for receiving the separated liquid or zinc in solution from the filter press, means for admitting steam into the vessel to separate the ammonium carbonate and ammonia from the zinc oxide and zinc carbonate, and a filter press and pump for withdrawing and separating the water and zinc oxide and zinc carbonate from the tank or vessel, as set forth.

6. Apparatus for treating zinc-gold slimes, including an oxidizing vessel, a rabbler, an agitating means, means for introducing a solution of ammonium carbonate into the agitating means, means including a filter press for withdrawing the product from said agitating means, a vessel for receiving the separated liquid from the filter press, means for admitting steam into the vessel to separate the ammonium carbonate and ammonia from the zinc oxide and zinc carbonate, a filter press and pump for withdrawing and separating the water and zinc oxide and zinc carbonate from the vessel and means for supplying water or solution to the pump to wash or treat the solids deposited in the filter press, as set forth.

7. Apparatus for treating zinc-gold slimes, including an oxidizing vessel, a rabbler, an agitating means, means for introducing a solution of ammonium carbonate into the agitating means, a pump and filter press for withdrawing the product from said agitating means, a vessel for receiving the separated liquid or zinc in solution from the filter press, means for admitting steam into the vessel to separate the ammonium carbonate and ammonia from the zinc oxide and zinc carbonate, and a dephlegmator for receiving the ammonia and ammonium carbonate from the vessel, with means for establishing communication between the vessel and the dephlegmator when a predetermined pressure is attained in the vessel, as set forth.

8. Apparatus for treating zinc-gold slimes, including an oxidizing vessel, a rabbler, an agitating means, means for introducing a solution of ammonium carbonate into the agitating means, a pump and filter press for withdrawing the product from said agitating means, a vessel for receiving the separated liquid or zinc in solution from the filter press, means for admitting steam into the vessel to separate the ammonium carbonate and ammonia from the zinc oxide and zinc carbonate, a dephlegmator for receiving the ammonia and ammonium carbonate from the vessel, the dephlegmator tank being provided with an overflow pipe for delivering the water carrying a small amount of ammonia from said tank to a sump, and means for leading said solution from the sump to the filter press which receives the product from the agitating means so that it can be used as a wash for the solid separated in the press, as set forth.

9. Apparatus for treating zinc-gold slimes, including an oxidizing vessel, a rabbler, an agitating means, means for introducing a solution of ammonium carbonate into the agitating means, a pump and filter press for withdrawing the product from said agitating means, a vessel for receiving the separated liquid or zinc in solution from the filter press, and means for admitting steam into the vessel to separate the ammonium carbonate and ammonia from the zinc oxide and zinc carbonate, a dephlegmator for receiving the ammonia and ammonium carbonate from the vessel, and means for leading the same from the vessel to the bottom of a series of Woulfe's bottles containing ammoniacal water for dissolving the gases and forming a solution of ammonia and ammonium carbonate, as set forth.

10. Apparatus for treating zinc-gold slimes, including an oxidizing vessel, a rabbler, an agitating means, means for introducing a solution of ammonium carbonate into the agitating means, a pump and filter press for withdrawing the product from said agitating means, a vessel for receiving the separated liquid from the filter press, means for admitting steam into the vessel to separate the ammonium carbonate and ammonia from the zinc oxide and zinc carbonate, a filter press and pump for withdrawing and separating the water and zinc oxide and zinc carbonate from the vessel, a dephlegmator for receiving the ammonia and ammonium carbonate from the vessel, a series of Woulfe's bottles containing ammoniacal water, means for leading the ammonia and ammonium carbonate from the dephlegmator to the first of the Woulfe's bottles, a furnace for calcining the zinc oxide and zinc carbonate, and means for passing the evolved carbon dioxide from the furnace to the first of the Woulfe's bottles to convert the free ammonia into ammonium carbonate, and means for conveying the ammonium carbonate from the Woulfe's bottles to the agitating means, as set forth.

In testimony whereof I have signed my name to this specification.

CHARLES EDWARD MEYER.